(12) United States Patent
Blandina et al.

(10) Patent No.: US 7,216,091 B1
(45) Date of Patent: May 8, 2007

(54) STORED VALUE TRANSACTION SYSTEM INCLUDING AN INTEGRATED DATABASE SERVER

(75) Inventors: Michael Blandina, Aurora, CO (US); Robert Berry, Salt Lake City, UT (US); Mari Belczynski, Aurora, CO (US)

(73) Assignee: American Express Travel Related Services Company, Inc., New York, NY (US)

( * ) Notice: Subject to any disclaimer, the term of this patent is extended or adjusted under 35 U.S.C. 154(b) by 0 days.

(21) Appl. No.: 09/241,188

(22) Filed: Feb. 1, 1999
(Under 37 CFR 1.47)

(51) Int. Cl.
G06Q 30/00 (2006.01)

(52) U.S. Cl. .................. 705/26; 345/744; 345/760; 345/764; 709/217; 709/220; 709/223; 709/315; 709/316

(58) Field of Classification Search .............. 705/14, 705/16, 17, 21, 35, 40, 28, 29, 26, 27
See application file for complete search history.

(56) References Cited

U.S. PATENT DOCUMENTS

| | | |
|---|---|---|
| 3,970,992 A | 7/1976 | Boothroyd et al. |
| 4,851,650 A | 7/1989 | Kitade |
| 4,882,473 A | 11/1989 | Bergeron et al. |
| 5,036,461 A | 7/1991 | Elliott et al. |
| 5,335,169 A | 8/1994 | Chong |
| 5,420,405 A | 5/1995 | Chasek |
| 5,459,304 A | 10/1995 | Eisenmann |
| 5,521,363 A | 5/1996 | Tannenbaum |
| 5,544,246 A | 8/1996 | Mandelbaum et al. |
| 5,566,327 A | 10/1996 | Sehr |
| 5,574,269 A | 11/1996 | Mori et al. |
| 5,577,109 A | 11/1996 | Stimson et al. |
| 5,638,519 A | 6/1997 | Haluska |
| 6,047,267 A * | 4/2000 | Owens et al. ............. 705/34 |

(Continued)

FOREIGN PATENT DOCUMENTS

EP 000667586 A2 * 8/1995

(Continued)

OTHER PUBLICATIONS

Deborah Radcliff, "Universal servers: Does on size fit all?" Software Magazine. Englewood: May 1997. vol. 17, Iss. 5; pp. 36, 7 pages, downloaded from ProQuest on the Internet on Jan. 18, 2007.*

Primary Examiner—Jaime Zurita
(74) Attorney, Agent, or Firm—Snell & Wilmer L.L.P.

(57) ABSTRACT

An integrated database and information server are provided that efficiently share information and tasks between various stored value programs. A server is configured to provide reusable objects and data structures that are suitably shared between various stored value products. A database at the server allows data to be shared between various programs so that each consumer associates with only one database record even though that consumer may use multiple shared value products. An exemplary common record for a consumer includes information relating to mailing addresses, preferred language, and the like. By integrating modules and avoiding duplicate records, the record communicates with all stored value programs, so the information does not need to be repeatedly entered into the database. Moreover, new stored value products are quickly and easily created through selection and arrangement of various shared objects preferably maintained within the database.

13 Claims, 11 Drawing Sheets

U.S. PATENT DOCUMENTS 6,078,891 A * 6/2000 Riordan et al. ................ 705/10
6,226,623 B1 * 5/2001 Schein et al. .................. 705/35

FOREIGN PATENT DOCUMENTS

| WO | WO 97/10560 | 3/1997 |
| WO | WO 98/08175 | 2/1998 |
| WO | WO 99/05633 | 2/1999 |

* cited by examiner

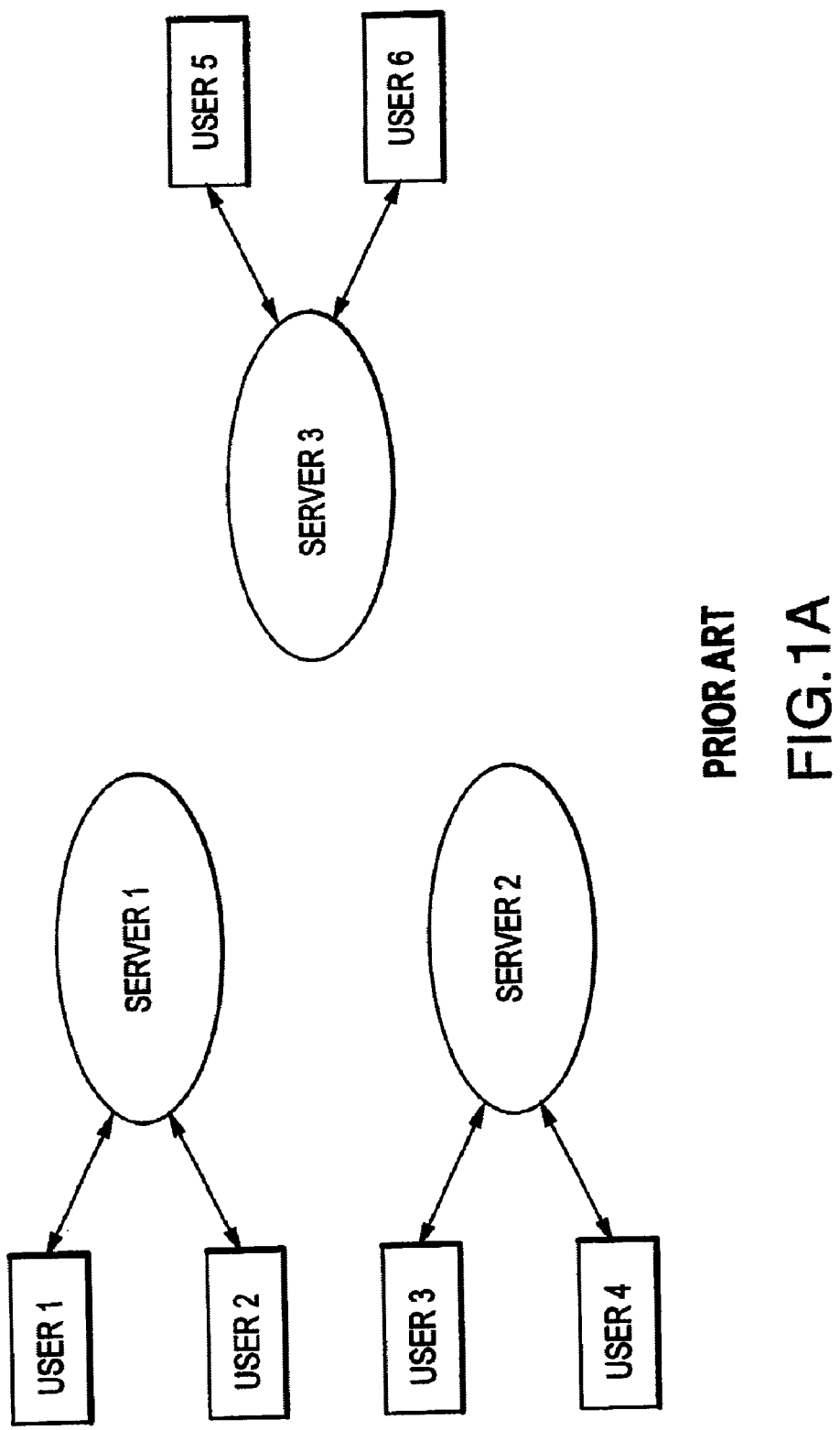

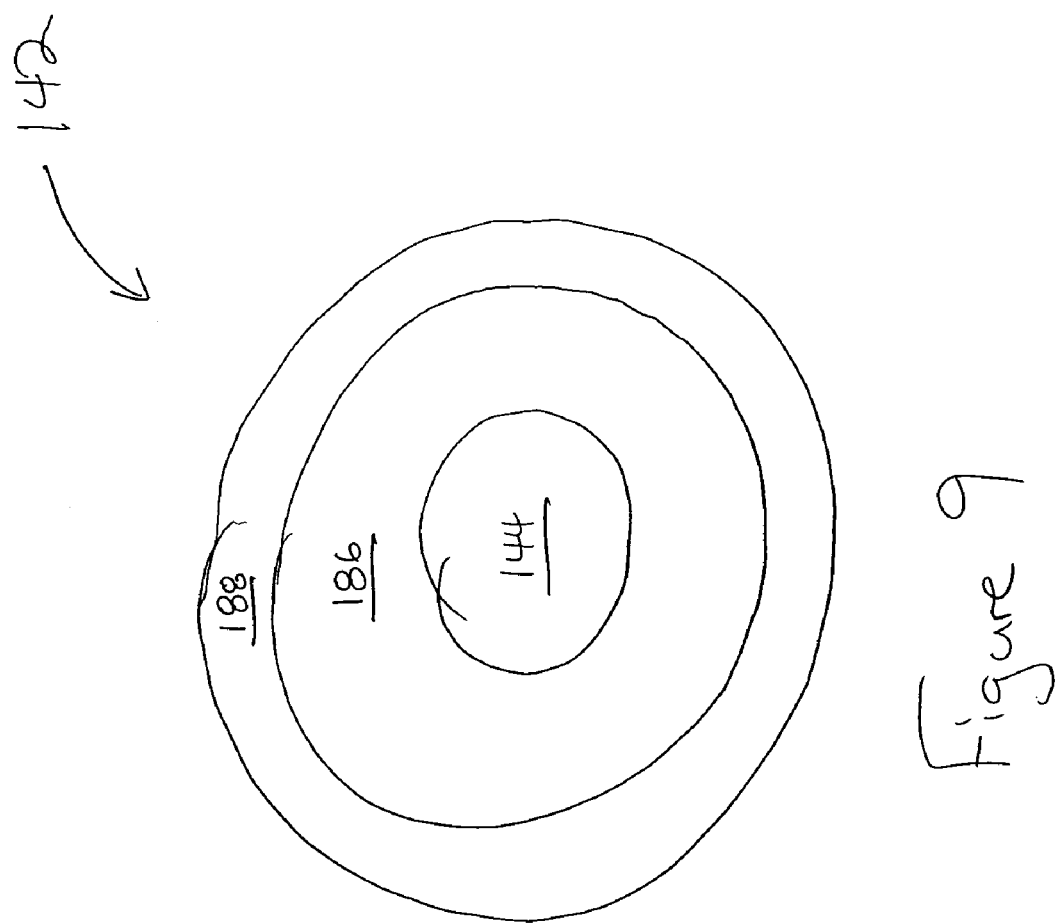

STORED VALUE TRANSACTION SYSTEM INCLUDING AN INTEGRATED DATABASE SERVER

This application claims priority under 35 U.S.C. § 120 of application Ser. No. 09/105,406 filed on Jun. 26, 1998.

FIELD OF THE INVENTION

The present invention relates generally to financial transaction systems, and more particularly, to a computer server and architecture for managing financial transactions involving stored value products such as smartcards.

BACKGROUND OF THE INVENTION

Financial systems using stored value products are well-known in the art. An example of a stored value product is a pre-paid telephone card, which is typically a plastic or paper card with a unique identification code. The code may be printed on the front of the card, or it may be stored electronically on a magnetic stripe that is attached to the card. To access the value on the card, consumers may, for example, dial a pre-determined phone number and input the unique code, thereby identifying the card and allowing the consumer to access a service (such as long distance telephone service). Besides telephone services, magnetic stripe cards have been used to pre-pay for, among other things, gasoline or department store merchandise. In these industries, special card reading machines such as those found in many retail establishments (e.g. point of sale (POS) terminals) are typically configured to read the magnetic stripes incorporated onto the card.

A relatively new stored value technology is the smartcard which typically replaces the magnetic stripe with a microprocessor. Other stored value products include, for example, ATM cards, at-home banking and many Internet commerce products.

Stored value products have been suggested as a replacement for cash in many transactions because such products have been shown to be secure and convenient without compromising the privacy of the user. Consumers frequently purchase stored value cards for pre-determined amounts, or, alternatively, the card may be configured to hold an electronic representation of value that the consumer has purchased.

However, unlike cash transactions, stored value transactions typically utilize an administrator to facilitate card creation, card distribution, transaction management, and/or the like. Administering institutions frequently support multiple stored value products through computer systems that are configured to track information such as card balances, consumer mailing addresses, financial transactions and/or the like. The interfaces and components associated with each stored value product (smartcard, phone card, ATM card, etc) often require that each product be administered by a dedicated computer system. Accordingly, when administering institutions support multiple stored value products, they often support multiple computer systems. As shown in FIGS. 1A and 1B, these computer systems are frequently disjoint systems configured to support only one particular stored value product. These disjoint systems are usually inefficient because they often incorporate substantial duplication in data and administrative overhead. For example, functions that are commonly implemented on each administration system include, among others: adding new cards, enrolling customers in new accounts, issuing personal identification numbers (PINs), adding value to smartcards and other accounts, handling transactions (merchant, ATM, telephone, etc.), and generating reports (such as billing statements and letters to consumers). An example of such a prior art pre-paid card system is disclosed in U.S. Pat. No. 5,577,109 issued on Nov. 19, 1996 to Stimson et al., which is incorporated herein by reference. Similarly, a system for supporting multiple functionality on a single card is disclosed in U.S. Pat. No. 5,574,269 issued on Nov. 12, 1996 to Mori et al., which is incorporated herein by reference.

Recently, as shown in FIG. 1B, some disjoint administrative systems have become somewhat more integrated through the sharing of limited functionality such as card authorization and transaction processing. Although this arrangement is improved over that of FIG. 1A in that it is somewhat less redundant, the FIG. 1B arrangement still includes substantial duplication of information and administration because each program incorporates data records and general parameters such as currency type, language used, etc. Disjoint systems exhibit a further disadvantage in that each administration system is typically individually constructed, thus requiring excessive time, labor and expense to create, maintain and operate.

Accordingly, there exists a need for a card management system that will simultaneously support various stored value products and their associated functions. Such a system is needed to reduce implementation times, to improve data processing efficiency and to reduce administrative overhead for each system.

SUMMARY OF THE INVENTION

An integrated database and information server are provided that efficiently share information and tasks between various stored value programs. A server is configured to provide reusable objects and data structures that are common to multiple stored value programs. A database at the server allows data to be shared between various shared value product programs so that each consumer associates with only one database record even though that consumer may use multiple stored value products. An exemplary common record for a consumer includes information relating to mailing addresses, preferred language, and the like. By integrating modules and avoiding duplicate records, the record communicates with all stored value programs, so the information does not need to be repeatedly entered into the database. Moreover, new stored value programs are quickly and easily created through selection and arrangement of various reusable, shared objects stored in the database.

BRIEF DESCRIPTION OF THE DRAWING FIGURES

The above and other objects, features and advantages of the present invention are hereinafter described in the following detailed description of illustrative embodiments to be read in conjunction with the accompanying drawing figures, wherein like reference numerals are used to identify the same or similar parts in the similar views, and:

FIG. 1A is an exemplary entity relationship diagram of prior art administration servers for stored value products;

DETAILED DESCRIPTION OF PREFERRED EXEMPLARY EMBODIMENTS

Figure 1B:
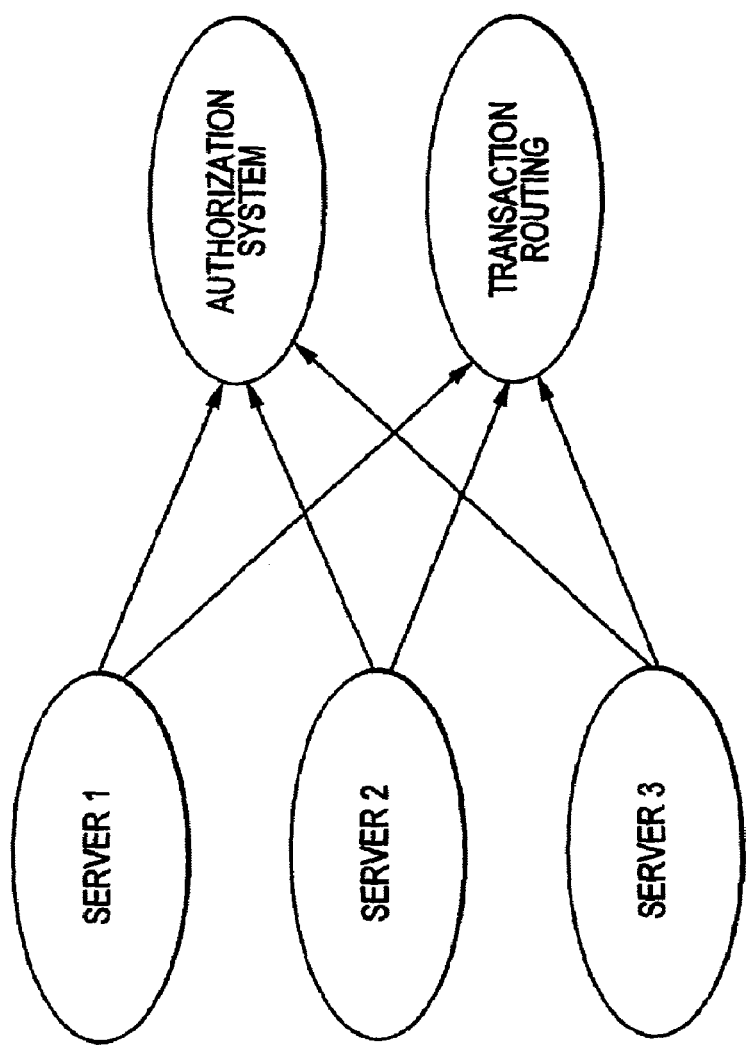
FIG. 1B is an exemplary entity relationship diagram of prior art administration servers for stored value products with limited functionality sharing.
Figure 2A:
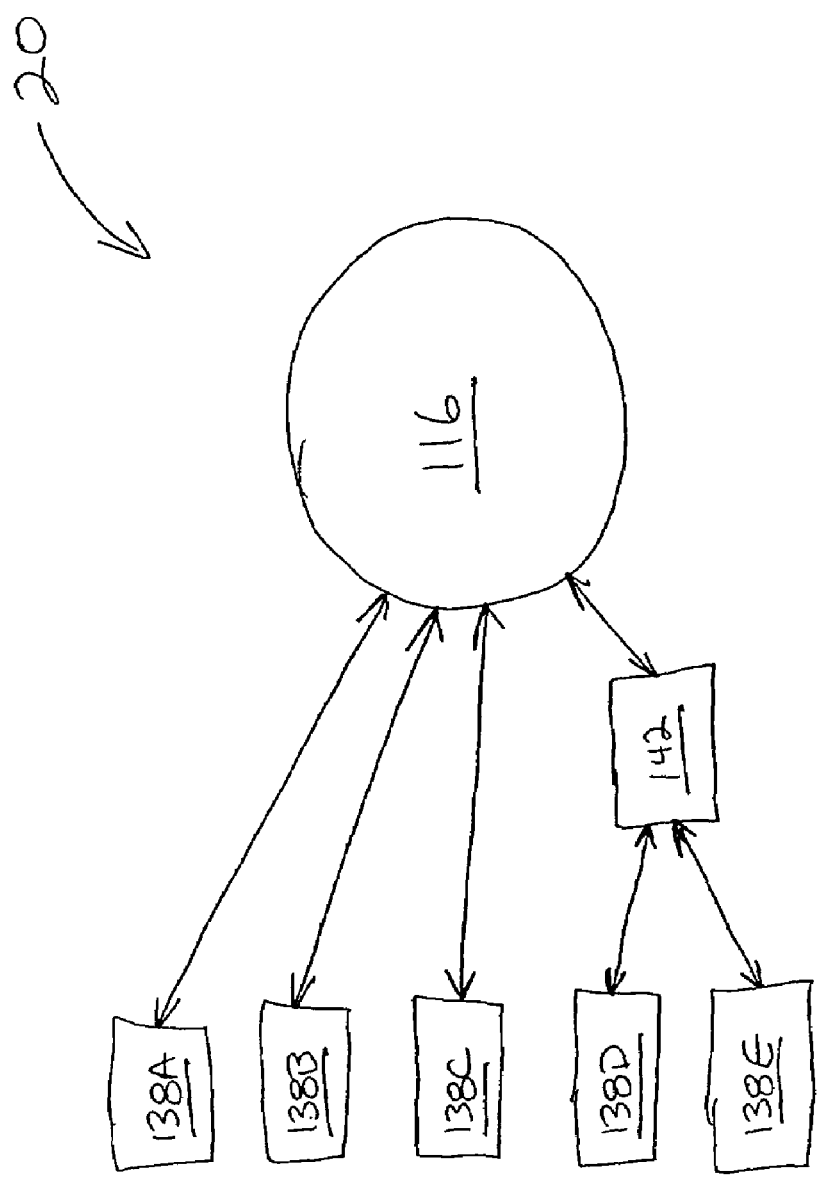
FIG. 2A is an entity relationship diagram of a first exemplary embodiment of the present invention.

Referring to FIG. 2A, a preferred embodiment of the invention suitably includes a system 20 which includes a database server 116 that suitably supports a number of stored value products such as, for example, various brands of smartcards, magnetic stripe cards, ATM cards, Internet transaction accounts, or other stored value products. Database server 116 generally provides centralized management of the various products, and preferably includes a database (such as a relational or object oriented database) that centralizes data and procedures to be shared across the various stored value products.

As shown in FIG. 2A, client system 138 is any device or entity that is suitably configured to include particular functionalities and to interface with a common server. Client systems 138 preferably include only the functionality that is unique to the particular client system 138, such as, for example, sales and pricing information and interface handling. In other words, most common functionality is located and shared at database server 116 such as, for example, card/account creation, addition of funds, account information, report information and/or the like (the details of the functionality are described below with respect to FIG. 8). In a particularly preferred embodiment, client system 138 represents a particular brand of a smart card. Client systems 138 suitably transmit data to database server 116 corresponding to the creation of new stored value cards/accounts and to the addition of funds in the stored value account. In alternative embodiments of the invention, client systems 138 suitably receive data such as account information and report information from database server 116. Alternatively, as can be seen from FIG. 2B, database server 116 interacts with client systems 138 through intermediating modules such as report generator 136 and card production system 128. In other embodiments, client 138 resides on database server 116, operating as a separate process. In still other embodiments, clients 138 are eliminated entirely and consumers and business entities interact directly with database server 116.

Server 116 preferably supports two modes of interacting with clients 138. The first mode of system 20 (shown by clients 138A, 138B and 138C in FIG. 2A) is typically referred to as a "centralized back end" or "centralized back office" because the client 138 merely acts as a "front end" (i.e. interface) for database server 116 which primarily handles data management functions. In embodiments wherein client 138 is a business entity, representatives of the client business entity provide information to database server 116 electronically, through online CSR input, or other means.

The second mode of system 20 (commonly called the "decentralized back end" or "decentralized back office") suitably incorporates a franchise server 142 between client systems 138D–E and database server 116. Franchise server 142 suitably interfaces with stored value products from several different organizations while retaining centralized data management in database server 116. In a particularly preferred embodiment, franchise server 142 supports a business entity having several customers corresponding to clients 138. As can be seen from FIG. 2A, a single database server 116 is preferably configured to simultaneously supporting multiple centralized and decentralized back office client systems 138. Alternatively, multiple database servers 116 are configured to interface with any combination of centralized or decentralized franchisers 142.

The various servers and clients discussed above are suitably connected through any electronic communication media including, for example, telephone links, leased lines, frame relay or asynchronous transfer mode connections, local area networks, or wide area networks. Alternatively, the client systems and servers are suitably interconnected through any combination of two or more data communications media. Although the communications links between client systems and server are preferably available at all times, some embodiments of the invention use polling or batch processing schemes whereby client systems and servers interact only at predetermined time periods. Alternatively, persons representing business entities provide information to database server 116 through any form of communication including telephone, Internet, mail or any other suitable means.

Figure 3:
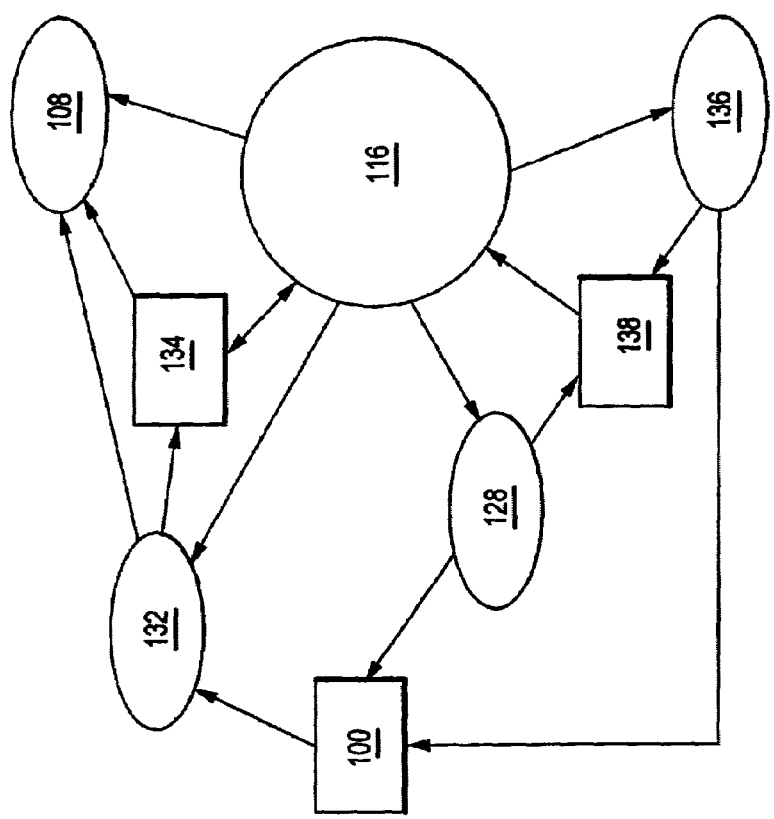
FIG. 3 is an entity relationship diagram showing exemplary data flows for creating and initializing a new stored value account.

As can be seen in the exemplary embodiment shown in FIG. 3, in use, a client 138 preferably notifies database server 116 of a consumer 100 request for a new card. In other embodiments of the invention, client 138 is bypassed and a new card request from a consumer 100 is provided to database server 116 electronically, or through a customer service representative, or through another means. After processing the new card request as discussed below, database server 116 preferably sends a message to card production system 128 which suitably creates a new card by known card creation methods and the new card is forwarded to consumer 100. Card production system 128 also suitably notifies the relevant client 138 (if applicable) that a card has been created.

After the card is created and sent to consumer 100, in preferred embodiments of the invention, consumer 100 activates the card prior to use. Activation is preferably accomplished through an activation server 132 that receives information about new cards from database server 116, preferably either in real time as cards are created, or alternatively, activation server 132 receives information in batches at predetermined periods of time. Various activation servers are known in the prior art and activation server 132 may be implemented internal or external to the present invention. To activate the card, consumer 100 suitably contacts activation server 132 via telephone, Internet or another connection to verify the consumer's identity. Consumer is verified through any suitable verification method, including recitation of a number printed on the card (or mailed with the card) or recitation of some identifying information about consumer 100 such as the consumer's social security number or parent's name. If the identity of consumer 100 is properly verified, then activation server 132 suitably notifies a transaction authorization system 108 that the card is approved for use. Various transaction authorization systems are known in the prior art and transaction authorization system 108 may be implemented internal or external to the present invention.

If the card is rejected, consumer 100 is preferably connected by telephone, Internet or other means to a customer service representative (CSR) 134 who verifies (preferably through online access to either client 138 or database server 116) the consumer's ability to use the stored value card or account. If the account is rejected by CSR 134, then the card or account will remain blocked and authorization system 108 rejects any use of the card or account. If the CSR is able to verify consumer 100 and the card/account, then CSR 134 preferably sends a "remove block" or comparable message to authorization system 108 so that consumer 100 may properly use the verified and activated account.

If consumer 100 wishes to add value to the previously created card/account, the consumer generally provides the added funds to a client 138 (via any communication means such as telephone, Internet, POS terminal, ATM machine, or the like) which in turn suitably passes the information to database server 116, causing database server 116 to update the consumer's account. In alternative embodiments, consumer 100 provides value directly to database server 116 in the form of a check or credit card number that may be electronically entered, or manually entered by a CSR. Alternatively, consumer 100 adds value to a card/account via, for example, a point of sale terminal, ATM machine, Internet connection or telephone connection. Funds are preferably recorded in database server 116 through a real-time or batch processing scheme.

Figure 2B:
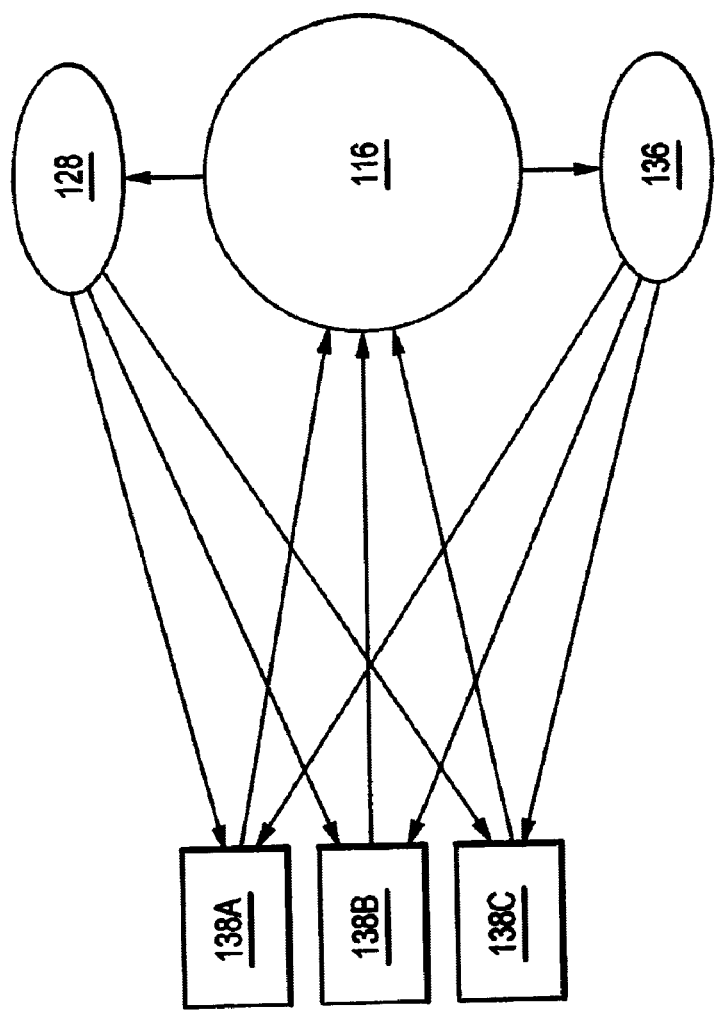
FIG. 2B is an entity relationship diagram of a second exemplary embodiment of the present invention.

FIG. 2A shows an exemplary direct bi-directional flow of information between client 138 and database server 116. In contrast, the exemplary embodiments shown in FIGS. 2B and 3 show database server 116 receiving information directly from clients 138A–C while providing data to clients 138A–C through intermediating systems 128 and 136. For example, database server 116 provides information to client 138 preferably by sending a "generate report" or similar message with all necessary parameters of the data to report generator 136 as shown in FIG. 3. Alternatively, database server 116 provides the report directly to client 138 through a telephone, Internet, or other connection.

Transaction processing is preferably managed through interaction between database server 116, authorization system 108, and a transaction capture module 112. As can be seen from FIG. 4, database server 116 suitably communicates card/account status information to authorization system 108. Status information generally includes account balance updates, status changes or the like for the various card accounts. For example, new cards are preferably assigned a "hold" status in authorization system 108 until consumer 100 initializes and validates the card as described above, at which time the authorization system preferably changes the status from "hold" to "pass" (or similar terms). A "hold" status is also preferably assigned if an account balance decreases below a minimum amount, or if a card is lost or stolen or the like. Accounts/cards that are assigned a "hold" status are preferably rejected by authorization system 108 in any subsequent requests for transaction approval.

Point of sale terminal 104 is any device that is capable of identifying and gathering data from any stored value product. For example, point of sale terminal 104 could be implemented as an actual terminal in a store, an Internet server, a telephone system, a card reader in a vending machine, an automatic teller machine, or any other device that is capable of accepting stored value information in financial transactions. Point of sale terminal 104 suitably communicates with authorization system 108 to approve or reject transactions based upon information available to the authorization system 108 from database server 116. Alternatively, authorization system 108 supplements information from database server 116 with information obtained from other external sources (not shown) such as external authorization systems, credit reporting bureaus, etc. Authorization preferably takes place in real time, but in some embodiments the authorization is accomplished using a polling or batch processing scheme. In a preferred embodiment, when a consumer 100 presents a stored value card or enters an account at a point of sale terminal 104, the terminal sends an authorization request for the transaction to authorization system 108. Additionally, for some transactions (such as those involving very small amounts of money) point of sale terminal 104 may not transmit an authorization request at all. Although authorization may take place over any communications medium, authorization preferably occurs over a data communications link such as a telephone link, a leased line, the Internet, a wide area network, or the like.

If the transaction is authorized, the transaction is preferably completed at point of sale terminal 104. Point of sale terminal 104 generally requests information such as the transaction amount and the identity of the stored value product used to pay for the transaction and this information is then suitably transmitted to transaction capture module 112 for settlement. To facilitate batch processing of settlement requests, merchants generally store information for multiple transactions. Alternatively, settlement requests are suitably transmitted in real time or are suitably polled by transaction capture module 112.

Figure 4:
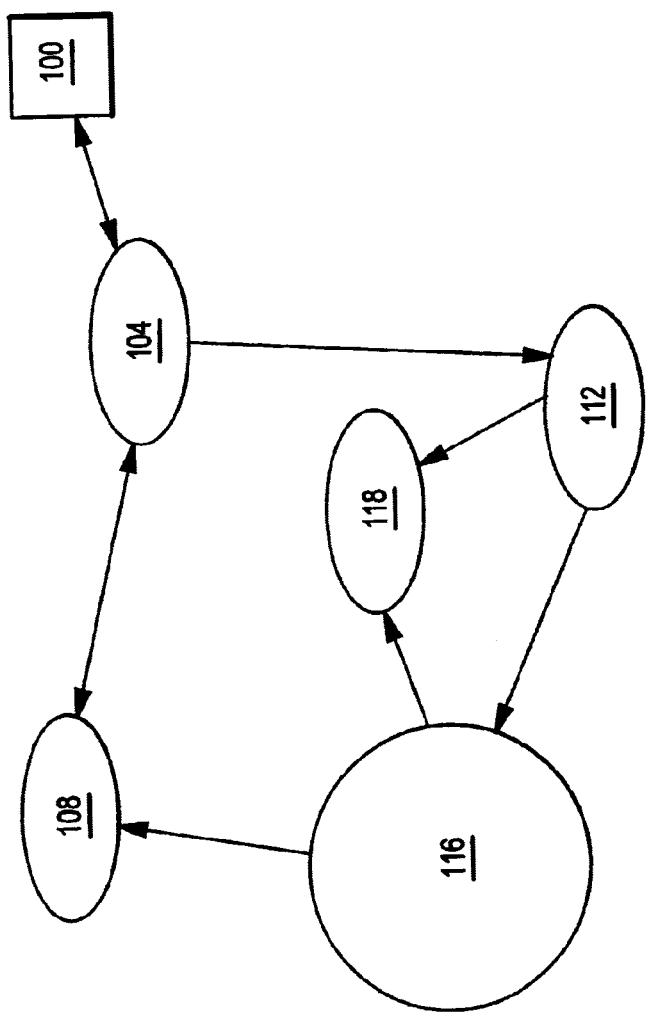
FIG. 4 is an entity relationship diagram showing exemplary data flows for transaction processing.

With continued reference to FIG. 4, transaction capture module 112 suitably captures financial transaction data from POS terminal 104 and routes this information to database server 116. During a purchase transaction involving a stored value product, funds are suitably transferred from an account associated with a stored value card into a merchant's account. Records for card and merchant accounts are generally accessible by database server 116, and are preferably maintained within database 142 (not shown in FIG. 4). A balancing system 118 is preferably located between database server 116 and transaction processing module 112 to verify transaction data. Balancing system 118 is any computer system that provides a check based upon data received from database server 116 and transaction processing module 112.

Figure 5:
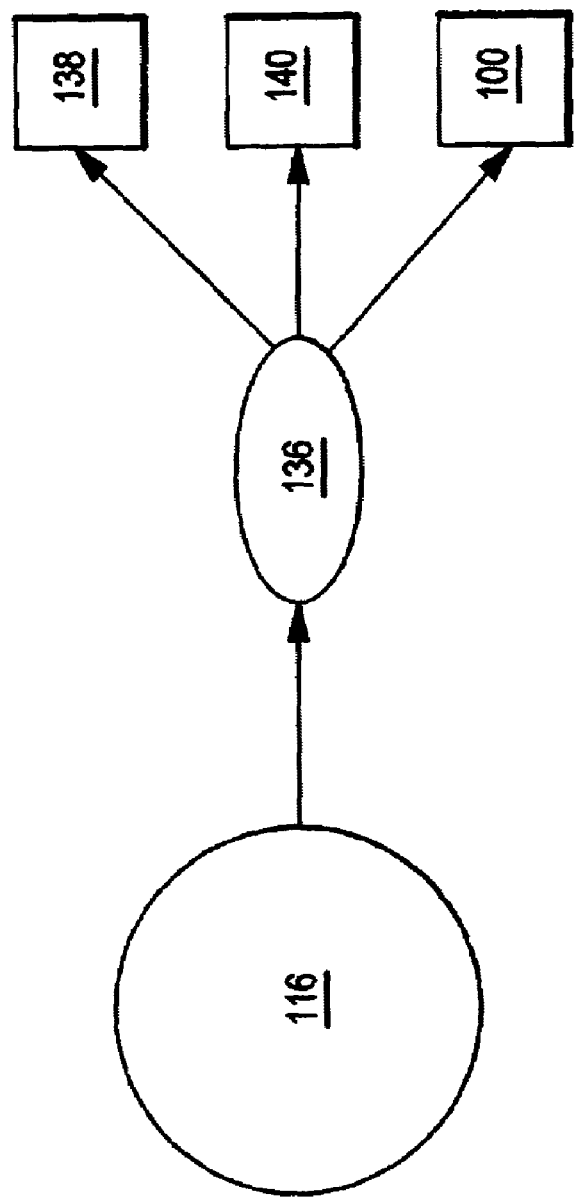
FIG. 5 is an entity relationship diagram showing exemplary data flows for report generation.

As best shown in FIG. 5, a single report generator 136 preferably generates reports (1) for client system 138 using stored value products, as described above; (2) for merchants 140 that accept stored value products as compensation for goods or services; or (3) for consumers 100 that receive, for example, periodic statements of their accounts and transactions. Alternatively, multiple report generators 136 create various reports. As another alternative, database server 116 internally generates some or all reports without the use of an external report generator 136. In some embodiments of the invention, reports are generated in real-time (i.e. as requested by the account manager, the consumer, the database server 116, or any another entity). Alternatively, reports are processed in varying embodiments in batches, at predetermined times, when polled by the report generator, or by any other timing arrangement. Report generator 136 preferably retrieves relevant data from a database associated with database server 116. In other embodiments, database server 116 provides necessary data to report generator 136 as part of a report generation request. Alternatively, database server 116 suitably sends a pointer (such as a memory address accessible via a shared bus, or a uniform resource locator (URL), or any other pointer) to information that is stored. After obtaining data for the report requested, report generator 136 formats the data and provides the data to the proper client system 138. Various report generating systems are known in the prior art, and any report formatting system may be used in accord with the present invention.

Figure 6:
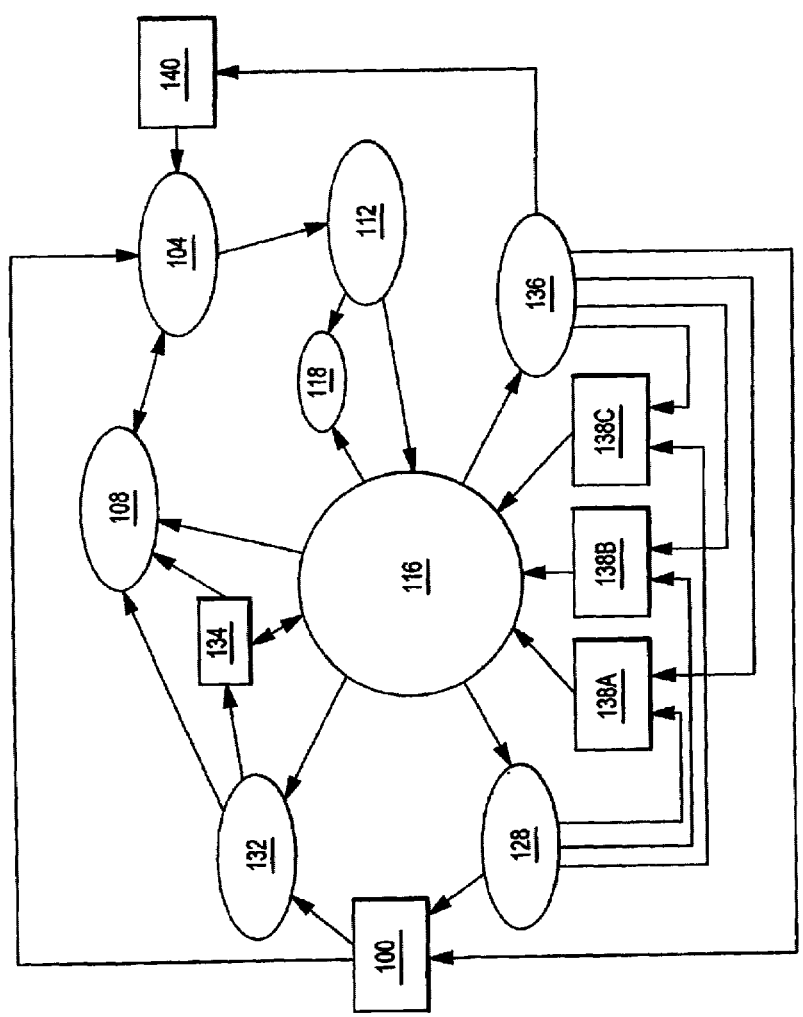
FIG. 6 is an entity relationship diagram of an exemplary embodiment of a database server based transaction system.

FIG. 6 shows an exemplary embodiment of a combined system for adding cards, handling transactions and processing reports. As can be readily ascertained from FIG. 6, a preferred embodiment of a stored value transaction system includes a database server 116 supporting multiple stored value products, each product preferably being associated with a particular client 138. Database server 116 preferably receives input from client system 138 and from a transaction capture module 112, as well as optional online input from consumers or customer service representatives 134. Stored value cards and accounts are preferably registered with an authorization server 108 that is configured to approve or deny individual transactions at various point of sale terminals such as terminal 104 in the drawing figures. Preferably, database server 116 communicates with a report generating system 136 that is configured to assemble data into reports for client systems 138, merchants 140 and/or consumers 100, thereby formatting and simplifying data output from database server 116.

Figure 7:
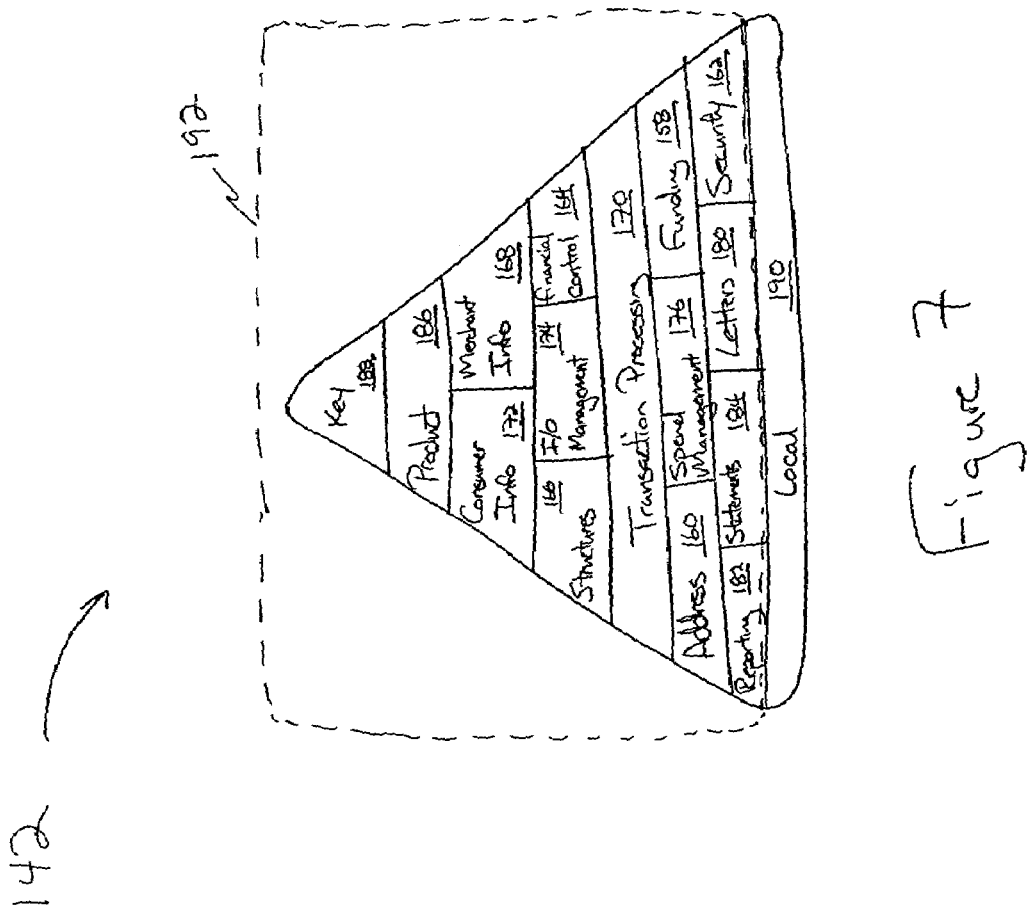
FIG. 7 is a functionality pyramid showing an exemplary arrangement for a database server.

As stated above, database server 116 includes common data and operations for the various stored value products. Database server 116 preferably retains at least core information 192 and local information 190, as shown in FIG. 7. Core information 192 generally includes all functions, data, software and infrastructure that are common to all stored data products, including database management, interface formatting, transaction management and various product features. Local information 190 is generally non-standard information that is specific to a particular product, country or consumer that provides no shared value for other applications. Local information 190 includes, for example, language details, local currency, taxes, customs, address formats, and local interface data. Separating local information 190 from core information 192 allows flexibility to implement coding "shortcuts" that may provide the most effective solution to certain individual tasks. Shortcuts are possible because some local information 190 is not applicable to core information 192. Moreover, local information 190 is located at the bottom of the database organizational pyramid shown in FIG. 7, indicating that local data does not substantially update or modify core information 192. Core information 192, however, frequently modifies local information 190. Thus, separating high value business rules and objects (i.e. core information 192) from low-level technical infrastructure (i.e. local information 190) promotes implementation independence, and hence greatly facilitates the sharing of data and resources between disjoint stored value products.

Database server 116 generally retains information substantially within a database 142 that is preferably a relational or object oriented database. In a particularly preferred embodiment, database server 116 is an AS/400 computer running DB/2 database server software available from the IBM Corporation of Armonk, N.Y. In other exemplary embodiments, database 142 is implemented using SQL Server (available from the Microsoft Corporation of Redmond, Wash.), ORACLE Database Server (available from the Oracle Corporation of Redwood Shores, Calif.) or ADAPTIVE Server (available from the Sybase Corporation of Emeryville, Calif.) running on any form of computer hardware.

In a preferred embodiment, database 142 is separated into various logical subsystems generally identifying particular classes of objects. Classes of objects generally include, inter alia, functions and attributes. "Functions" correspond to operations performed by objects of the particular class. "Attributes" correspond to characteristics that objects of the class exhibit. For example, a "smartcard" class generally contains functions for creating new cards and adding value to existing cards, as well as attributes that identify cardholders and accounts. Subsystem classes as shown in FIG. 7, then, generally contain objects that perform related functions and/or retain related information.

Database 142 preferably contains a "key" field that partitions the database according to a high-level class of objects. An example of a "key" field is the "business unit" class 188 shown in FIG. 7. In the exemplary embodiment shown in FIG. 7, the "business unit" class 188 organizes the database into partitions corresponding to, for example, a company organizational structure. Alternate embodiments of the invention organize database 142 in radically different fashions by using differing key fields. For example, the key could be used to logically separate database 142 according to geographic region (e.g. "North America", "Europe" and "Asia"), or according to product classes (e.g. "Smartcard", "ATM card", "Internet account" and the like), or according to any other suitable differentiator. Key object class 188 substantially defines many of the default values for various dependent classes because objects depending from key object class generally inherit substantially all of the attributes and functions defined for the parent class. In an embodiment that uses "business unit" as a key class 188, for example, all database objects that reside in the same business unit generally share common default currencies, languages, product details, address masks and the like.

Regardless of the particular key field 188 selected, in preferred embodiments the key field 188 logically separates objects maintained on database 142. Objects with differing "key" values 188 are preferably separated by hardware or software "firewalls" that partition database 142 based upon the key. A firewall is any mechanism that prevents access across a logical boundary. Although the firewalls are preferably implemented as software access controls, alternate embodiments include user ID/password schemes or hardware controls such as router-implemented access restrictions. Alternatively, multiple firewall techniques such as physical access controls and software controls are combined. Firewalls generally preserve business unit autonomy and data integrity by isolating data according to, for example, the key field.

In a preferred embodiment, secondary classes 186 depending from key class 188 are created to substantially define individual stored value programs. Each of these secondary classes 186 generally depends from the key class 188. Alternatively, intermediate classes (corresponding to geographic region, business sub-units, or any other suitable form of differentiator) exist between the highest level key class 188 and the "products" class 186. In the exemplary embodiment shown in FIG. 7, secondary object class 186 differentiates various products belonging to the same key class 188. Objects belonging to the secondary "product" class 186 inherit attributes and functions from the applicable parent "business unit" class 188.

Figure 8:
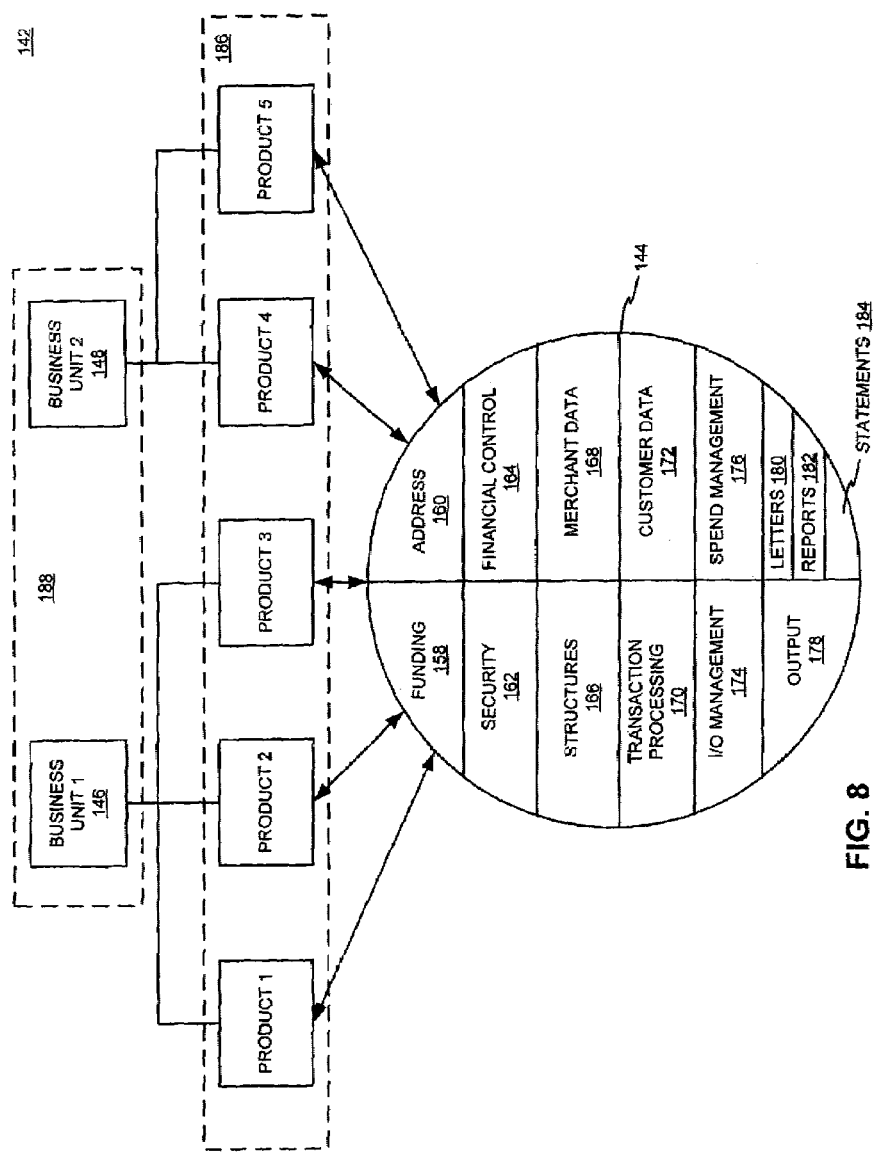
FIG. 8 is an entity relationship diagram showing data flows for an exemplary implementation of the database authorization.
Figure 2A:
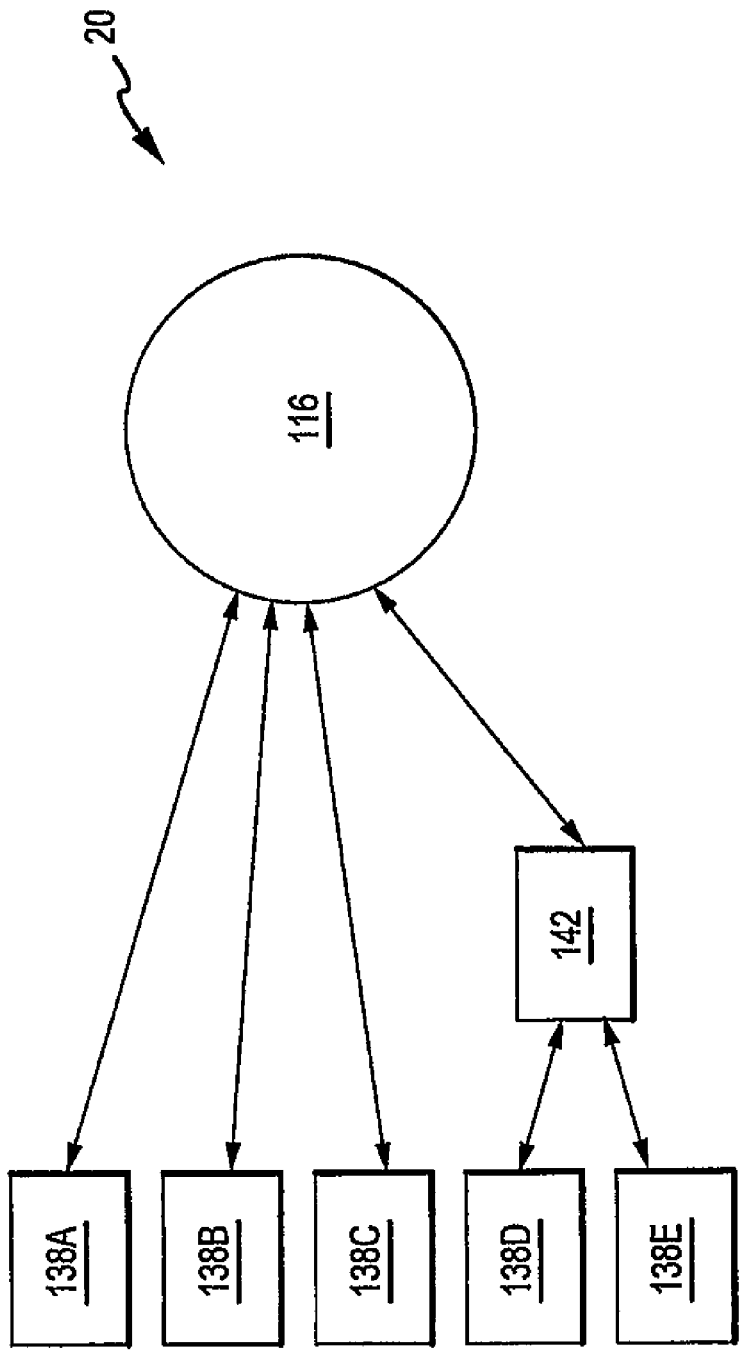

The exemplary embodiment shown in FIG. 8 includes a "business unit" key 188 that separates database 142 into Business Unit One (BU1) 146 and Business Unit Two (BU2) 148. Objects BU1 146 and BU2 148 in FIG. 8 are instances of the key "business unit" class 188, and elements 150, 152, 154, 156, and 158 are instances of secondary "product" class 186. In the example shown in FIG. 8, objects 150, 152, and 154 depend from object BU1 146, and objects 156 and 158 depend from object BU2 148. Each of the product objects 150, 152, 154, 156, and 158 represents a separate stored value product such as a particular smartcard program, ATM card program, or the like. For example, both product object 150 and product object 156 could define smartcard products, even though these two objects depend from different business units. Although the two "smartcard" classes are distinct from each other and each preferably contains independent local data, functions and attributes, the two object classes preferably share functions and attributes as described below.

With continued reference to FIG. 8, database 142 preferably includes an object repository 144 that generally functions as a library of objects. Objects retained within repository 144 suitably perform various functions or retain particular formats of data, as described below. These objects are suitably utilized by objects of key class 188 and secondary class 186, as well as any intermediating classes (not shown). Objects contained in repository 144 generally provide core functionality required by the various product objects 186. Because each product object 186 has access to the entire repository 144 of core information, objects stored in repository 144 are effectively shared and re-used by the various key objects 188 and secondary objects 186, thus resulting in substantially reduced programming effort and implementation time. Moreover, many objects contained within repository 144 suitably utilize other objects in the repository.

Different embodiments organize the various classes depending from the key class 188 in a variety of ways. Although repository 144 is shown in FIG. 8 as distinct from objects belonging to key class 188 and secondary class 186, this distinction is a logical distinction made for purposes of explanation only. One skilled in the art would understand that any organization of database 142 would fall within the scope of the present invention. For example, database 142 could be organized hierarchically, sequentially or in any another suitable manner. Objects in database 142 are preferably organized in a manner that provides optimum performance while efficiently using hardware resources such as storage space and memory on database server 116.

Repository 144 generally includes various groupings of objects (called "subsystems") that have similar attributes or that perform similar functions. Although particular subsystems are described herein and in the accompanying drawings, one skilled in the art would appreciate that various object groupings could be formulated that are within the scope of the invention. For example, any of the groupings presented herein could be eliminated, or additional groupings could be added. Moreover, the various objects could be arranged in any of a variety of subsystems. The various subsystems of an exemplary preferred embodiment of repository 144 are discussed below.

With continued reference to FIG. 8, the various subsystems within repository 144 will now be described. Funding subsystem 158 within repository 144 generally includes objects that add value to stored value cards. Funding features are generally selected according to relevant product classes so that funds from many sources may be applied to many different stored value products without requiring individualized programming for each product. For example, an "ATM account transfer" object defines a process for transferring money from a consumer's checking account to a stored value card in response to the consumer's input at an ATM. Once defined, this object is preferably used by multiple product objects such that the same software code facilitates ATM transfers to smartcards, phone cards, and other stored value products. The funding subsystem preferably includes such features as funding delays, input of batch funds, applying funding fees, applying funds at a card or an account level, or handling suspended/held funds.

Customer records are preferably maintained in a customer data subsystem 172 that generally implements a single database record for each customer even though the customer may use multiple stored value products. Card data, account data, client data customer data and the like all generally reside within customer information subsystem 172, which frequently communicates with objects from the products, funding, transaction processing and address subsystems described herein. Additionally, many user interface elements such as screens and access control are generally contained within the client demographics subsystem.

Objects associated with merchant data subsystem 168 generally enable specific merchant processing options. Other objects preferably store contract information relative to specific merchant product offerings, such as special offers or joint marketing efforts such as rebates, loyalty awards, etc. Merchant data subsystem also preferably includes accounts payable objects that enable merchants to capture stored value transactions for settlement.

Addresses (including, for example, customer billing addresses, merchant addresses and the like) are preferably maintained in address subsystem 160. Address subsystem 160 generally houses address information and provides an interface with all other subsystems needing address information, such as the customer and merchant data subsystems 172 and 168, respectively. Address subsystem 160 suitably provides a single point for maintaining substantially all of the address information stored in database 142, and preferably supports multiple addresses for each person (e.g. home, business and Internet addresses, among others). Other objects in address subsystem 160 preferably support temporary addresses, optionally with an associated "effective date" such that forwarding addresses, traveling addresses, and the like are supported.

Transaction processing subsystem 170 generally includes objects for storing and managing financial and non-financial transactions. Preferably, many objects associated with transaction processing subsystem 170 contain mechanisms to provide substantially real time access to financial data by, for example, customer service representative 134 as described above for online transaction inquiries. Preferably, transaction processing subsystem 170 is also accessible by at least customers and merchants. Transactions are generally formatted by type (e.g. airline, car rental, retail purchase, and the like) such that transaction records are easily searchable.

Preferably, repository 144 includes a spend management subsystem 176 that includes objects that implement various product-specific spend management rules. For example, spend management rules may allow certain cards to only be used at specified merchants within a particular geographic region, or within a specific time period. Alternatively, spend management subsystem 176 may also provide available balance information to consumers or to external authorization system 108. Preferably, spend management subsystem includes objects that are configured to track spending patterns of cardholders/consumers to assist in determining product effectiveness.

Repository 144 preferably includes an input/output (I/O) management subsystem 174 that includes objects for funneling interface data in and out of database system 116. Preferably, I/O management subsystem 174 includes objects that track, manage and log data sent and received by database system 116. In a preferred embodiment, I/O management subsystem 174 contains mechanisms for real-time access to database information that are utilized by, for example, CSRs and customers needing access to data retained transaction processing subsystem 170.

Financial control subsystem 164 generally includes objects that are configured to substantially protect the financial integrity of database system 116. Generally, financial control system 164 receives data from transaction capture module 112, as well as funding subsystem 158 to maintain accurate account balance information. Financial control system 164 optionally includes objects that implement an interface to disputes and adjustments subsystems (not shown).

Data sharing between various objects and classes is preferably facilitated by a structures subsystem 166 that suitably combines groups of cards, accounts or merchants into common classes. The structures subsystem 166 establishes and maintains hierarchial relationships established by customers, corporations, governments and the like by defining data structures corresponding to these relationships. These data structures are suitably utilized to group members of a particular hierarchy together across various stored value products. In a preferred embodiment, structures subsystem 166 suitably allows viewing and reporting of such classes according to predefined hierarchies. Defining various relationships into structures presents several advantages over treating entities within the hierarchy individually. First, the data structures facilitate easy movement, copying and transferring of information from one entity to another because only the data structure (and not each individual member) need by moved. Secondly, structures may be suitably modified as a class, thereby reducing the need for changes to individual objects corresponding to members of the class. For example, if a data structure represents individuals belonging to a hierarchy (such as a corporate reporting structure) and the name of the hierarchy changes, the change need only be entered once (in the data structure object) and not in every object corresponding to every member of the hierarchy.

Database server 116 preferably includes a security subsystem 162 that includes objects for managing security controls throughout the database. Users generally are assigned one of various levels of authority based upon the user's need to obtain information. Security restrictions are preferably implemented at many levels in the database 142, including at the key class 188 level and the product class 186 level. Objects in security subsystem 162 generally implement the firewalls discussed above.

Objects from output subsystem 178 generally provide formatting and control of data output from database 142. In a preferred embodiment, outputs are administered by three separate optional subsystems corresponding to letters 180, reports 182 and statements 184. In other embodiments, a single output subsystem 178 provides all outputs. Letters module 180 preferably contains objects for generating and producing letters such as, for example, automated letters, event driven letters (e.g. negative balance, collections, etc.), CSR initiated letters (service, dispute resolution, etc.) and legal notifications (change in terms, legal disclosures, etc.). The reporting module preferably includes objects for scheduling, creating, and maintaining all database reports. In a preferred embodiment, objects included in report module 182 interfaces with external report generator 136 for actual report creation. Alternatively, objects included in reporting module 182 substantially prepare and format reports, thereby incorporating the functionality of external report generator 136. Objects associated with the statements module 184 preferably create or format database statements such as periodic bills. Objects included in output generation subsystem 178, 180, 182 and 184 preferably produce output via selectable media such as fax, paper, Internet or any other information transmission media.

Figure 9:
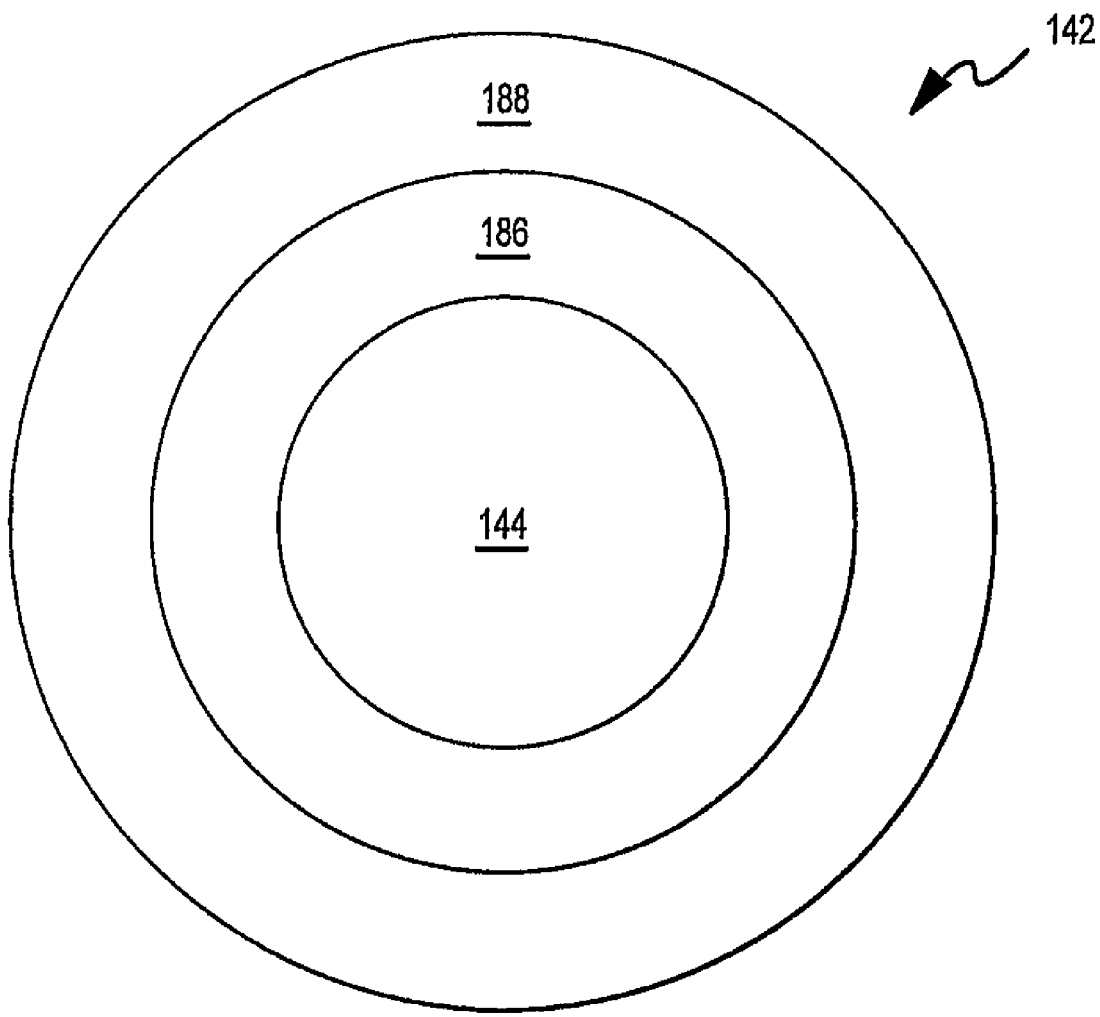
FIG. 9 is an entity relationship diagram showing an exemplary relationship between various objects in the database.

Referring now to FIG. 9, stored value products 186 are created using various objects from repository 144. Generally speaking, users create new products in accordance with a particular business unit 188 by selecting suitable objects from repository 144 that correspond to those attributes and functionalities desired in the new product 186. For example, a user may select, among others, an object for creating a card, various objects for storing value in an account associated with the card (or on the card itself), an object to manage financial transactions, and an object to generate reports for consumers. When these objects are selected, database server suitably assembles a product structure that references the various objects requested. In a preferred embodiment, product structures are tables of pointers to the various objects in repository 144, but any suitable method of organizing the various objects (such as in a data structure or in a database record) could be used. When the product executes, database server 116 retrieves the particular objects requested. Because this method of constructing products substantially reuses objects of pre-written code, design and implementation times are significantly reduced.

The corresponding structures, materials, acts and equivalents of all elements in the claims below are intended to include any structure, material or acts for performing the functions in combination with other claimed elements as specifically claimed. The scope of the invention should be determined by the appended claims and their legal equivalents, rather than by the examples given above.

We claim:

1. A system for managing a plurality of stored value products, said system comprising:

a server communicatively coupled to a database, wherein said server is configured to communicate with said plurality of stored value products over a network;

said database logically separated into a first subsection, a second subsection, a third subsection and an object repository, wherein said first subsection, said second subsection and said third subsection are logically separated via a firewall;

said first subsection containing a high-level key class of objects and a first plurality of secondary classes of objects derived from said high-level key class of objects, wherein each of said first plurality of secondary classes of objects define a business unit;

said second subsection containing a high-level secondary class of objects and a second plurality of secondary classes of objects derived from said high-level secondary class of objects, wherein each of said second plurality of secondary classes of objects define one of said plurality of stored value products; and, wherein said second plurality of secondary classes of objects inherit attributes from said high-level key class of objects;

said third subsection containing a high-level intermediate class of objects and a third plurality of secondary classes of objects derived from said high-level intermediate class of objects, wherein each of said third plurality of secondary classes of objects define at least one of a geographic region and a business sub-unit; and, wherein said third plurality of secondary classes of objects inherit attributes from at least one of said high-level key class of objects and said high-level secondary class of objects;

said object repository including a plurality of reusable classes from which said high-level key class of objects, said high-level intermediate class of objects, and said high-level secondary class of objects are derived; and wherein each of said second plurality of secondary classes of objects is associated with one of said plurality of stored value products.

2. The system of claim 1, wherein said plurality of stored value products includes a device selected from the group consisting of magnetic-stripe cards, smart-cards, ATM cards, and Internet transaction account cards.

3. The system of claim 1, wherein said high-level key class relates to a first business unit, and said high-level secondary class relates to a second business unit.

4. The system of claim 3, wherein the objects of said first business unit class share a common default language and a common default currency.

5. The system of claim 1, wherein said high-level key class relates to a first geographical region, and said high-level secondary class relates to a second geographical region.

6. The system of claim 1, wherein said high-level key class relates to a first type of stored value product, and said high-level secondary class relates to a second type of stored value product.

7. The system of claim 1, wherein said firewall includes software access controls.

8. The system of claim 1, wherein said firewall includes router-implemented access restrictions.

9. The system of claim 1, wherein said second plurality of secondary classes of objects are configured to load monetary values to said plurality of stored value products.

10. The system of claim 1, wherein said second plurality of secondary classes of objects are configured to deduct monetary values from said plurality of stored value products.

11. The system of claim 1, wherein said second plurality of secondary classes of objects are configured to activate said plurality of stored value products.

12. The system of claim 1, wherein said second plurality of secondary classes of objects are configured to create a new account for said stored value products.

13. The system of claim 1, wherein said third plurality of secondary classes of objects are configured to serve as intermediaries between said first plurality of secondary classes of objects and said second plurality of secondary classes of objects.

* * * * *

UNITED STATES PATENT AND TRADEMARK OFFICE
CERTIFICATE OF CORRECTION

PATENT NO.          : 7,216,091 B1
APPLICATION NO. : 09/241188
DATED               : May 8, 2007
INVENTOR(S)         : Blandina et al.

It is certified that error appears in the above-identified patent and that said Letters Patent is hereby corrected as shown below:

Please remove informal figure 2A (Sheet 3 of 11) and replace with formal figure 2A attached hereto.

Please remove informal figure 7 (Sheet 9 of 11) and replace with formal figure 7 attached hereto.

Please remove informal figure 9 (Sheet 11 of 11) and replace with formal figure 9 attached hereto.

Signed and Sealed this

First Day of January, 2008

JON W. DUDAS
*Director of the United States Patent and Trademark Office*

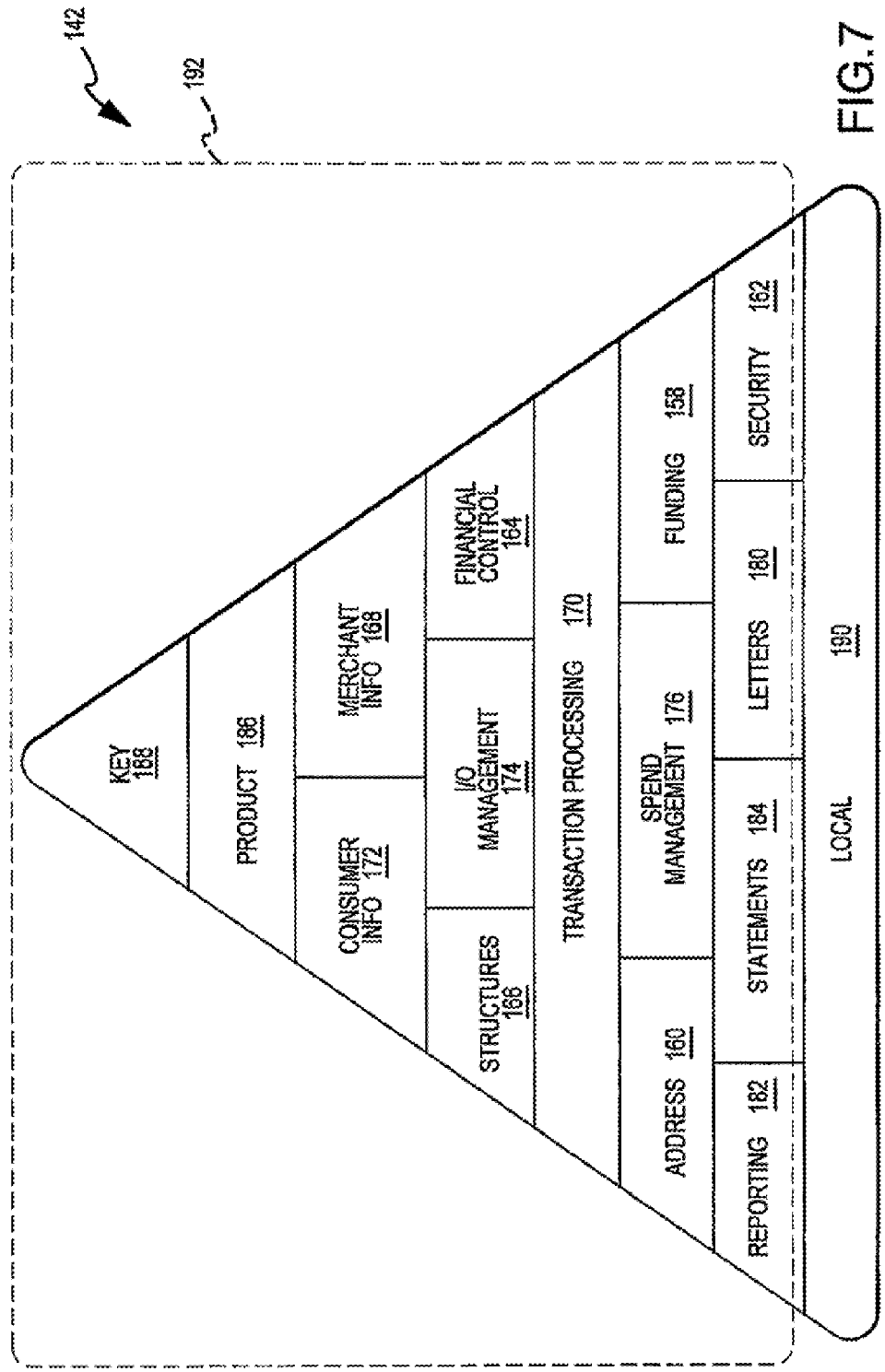

UNITED STATES PATENT AND TRADEMARK OFFICE
CERTIFICATE OF CORRECTION

| | | Page 1 of 1 |
|---|---|---|
| PATENT NO. | : 7,216,091 B1 | |
| APPLICATION NO. | : 09/241188 | |
| DATED | : May 8, 2007 | |
| INVENTOR(S) | : Michael Blandina et al. | |

It is certified that error appears in the above-identified patent and that said Letters Patent is hereby corrected as shown below:

On the Title page, section (60) Related U.S. Application Data, please insert therefor --Continuation of application No. 09/105,406 filed on Jun. 26, 1998--.

In Column 1 Line 5 please delete "of" and insert therefor --and is a continuation of--.

Signed and Sealed this

Fourth Day of January, 2011

David J. Kappos
*Director of the United States Patent and Trademark Office*